(12) United States Patent
Chen et al.

(10) Patent No.: US 11,116,359 B2
(45) Date of Patent: Sep. 14, 2021

(54) APPARATUS AND METHOD FOR PREPARING FOOD

(71) Applicant: KONINKLIJKE PHILIPS N.V., Eindhoven (NL)

(72) Inventors: Yun Chen, Eindhoven (NL); Ning Zhou, Eindhoven (NL); Wen Sun, Eindhoven (NL); Xiaoyun Kui, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 193 days.

(21) Appl. No.: 15/519,872

(22) PCT Filed: Oct. 1, 2015

(86) PCT No.: PCT/EP2015/072659
§ 371 (c)(1),
(2) Date: Apr. 18, 2017

(87) PCT Pub. No.: WO2016/062513
PCT Pub. Date: Apr. 28, 2016

(65) Prior Publication Data
US 2017/0245683 A1    Aug. 31, 2017

(30) Foreign Application Priority Data

Oct. 23, 2014 (WO) ................ PCT/CN2014/089290
Nov. 20, 2014 (EP) .................................... 14194127

(51) Int. Cl.
*A47J 37/06* (2006.01)
*F24C 15/32* (2006.01)
(Continued)

(52) U.S. Cl.
CPC ............. *A47J 37/0641* (2013.01); *A21B 1/26* (2013.01); *A21B 3/04* (2013.01); *A23L 5/13* (2016.08);
(Continued)

(58) Field of Classification Search
CPC .. A47J 37/0641; A47J 27/04; A47J 2027/043; A47J 27/004; A23L 5/17;
(Continued)

(56) References Cited

U.S. PATENT DOCUMENTS 550,516 A * 11/1895 Leigh
3,527,646 A    9/1970 Scheick
(Continued)

FOREIGN PATENT DOCUMENTS

CN    104146190 A    11/2014
JP    2004208531     7/2004
(Continued)

OTHER PUBLICATIONS

Bread NPL, Food Explainer: Why Does Steam Make Bread Light and Crusty?, Nadia Arumugam, https://slate.com/culture/2012/11/why-does-steam-make-bread-light-and-crusty-it-slows-down-the-cooking-process.html (Year: 2012).*

*Primary Examiner* — Drew E Becker
(74) *Attorney, Agent, or Firm* — Schott, P.C.

(57) ABSTRACT

Air-based fryer including a food preparation chamber including an outer wall, an inner wall defining a food receiving space with an air inlet and an air discharge opening, and a circulation channel defined between the outer wall and the inner wall. The fryer includes an air heater for heating air in the food preparation chamber, a fan for moving a flow of hot air successively through the air inlet, the food receiving space, the discharge opening, and the channel. The fryer includes a steam generator including at least one
(Continued)

nozzle extending into the food receiving space for spraying temperature-controlled steam onto the food; and a controller adapted to control the steam generator to spray steam to food placed in the food receiving space for a first predetermined period, and to control the air heater and the fan to circulate hot air to the food for a subsequent second predetermined period.

15 Claims, 10 Drawing Sheets

(51) Int. Cl.
    *F24C 15/00*     (2006.01)
    *A21B 3/04*     (2006.01)
    *A21B 1/26*     (2006.01)
    *A23L 5/10*     (2016.01)
    *A47J 27/00*     (2006.01)
    *A47J 27/04*     (2006.01)

(52) U.S. Cl.
    CPC .............. *A23L 5/17* (2016.08); *A47J 27/004* (2013.01); *F24C 15/003* (2013.01); *F24C 15/325* (2013.01); *F24C 15/327* (2013.01); *A23V 2002/00* (2013.01); *A47J 2027/043* (2013.01)

(58) Field of Classification Search
    CPC .................... A23L 5/13; F24C 15/003; F24C 15/322–15/327; A21B 1/24–1/26; A21B 1/36; A21B 3/04
    USPC ............ 426/233, 523, 510–511; 99/473–476
    See application file for complete search history.

(56) References Cited

U.S. PATENT DOCUMENTS

| | | | | |
|---|---|---|---|---|
| 4,426,923 A * | 1/1984 | Ohata | ................... | A47J 39/003 126/20 |
| 4,506,598 A * | 3/1985 | Meister | ................. | F24C 15/327 126/20 |
| 4,655,192 A * | 4/1987 | Jovanovic | ................. | A21B 3/04 126/20 |
| 4,700,685 A * | 10/1987 | Miller | ....................... | A21B 1/24 126/20 |
| 4,771,163 A * | 9/1988 | Thiboutot | ................. | A21B 1/26 126/21 A |
| 4,817,582 A * | 4/1989 | Oslin | ....................... | A21B 1/24 126/20 |
| 4,906,485 A * | 3/1990 | Kirchhoff | ................. | A21B 3/04 126/20 |
| 5,080,087 A * | 1/1992 | McFadden | .............. | F24C 3/087 126/20 |
| 5,767,487 A * | 6/1998 | Tippmann | ............ | A23B 4/0526 219/440 |
| 5,937,740 A * | 8/1999 | Kubota | .................. | A21B 7/005 219/401 |
| 5,968,574 A * | 10/1999 | Sann | ........................ | A23L 5/13 126/20 |
| 5,972,397 A | 10/1999 | Durance et al. | | |
| 6,267,046 B1 * | 7/2001 | Wanat | ..................... | A47J 27/05 99/332 |
| 6,450,085 B1 | 9/2002 | Riesselmann | | |
| 6,516,712 B1 * | 2/2003 | Ratermann | .............. | A21B 1/26 126/20 |
| 6,572,911 B1 * | 6/2003 | Corcoran | ............... | A21B 1/245 426/510 |
| 7,093,592 B2 * | 8/2006 | Cho | ......................... | A21B 3/04 126/20 |
| 7,261,101 B2 * | 8/2007 | Kim | ......................... | A21B 3/04 126/20 |
| 7,695,746 B2 | 4/2010 | Bows | | |
| 7,745,763 B2 * | 6/2010 | Fraccon | ................. | F24C 15/327 219/401 |
| 8,299,404 B2 * | 10/2012 | Van Der Weij | ...... | A47J 37/0623 126/21 A |
| 2004/0107953 A1 * | 6/2004 | Hegge | ....................... | A21B 1/26 126/21 A |
| 2007/0104844 A1 * | 5/2007 | Fraccon | ................ | F24C 15/327 426/496 |
| 2009/0183729 A1 * | 7/2009 | Barkhouse | .............. | A47J 27/62 126/39 BA |
| 2009/0250452 A1 * | 10/2009 | Tse | ......................... | F24C 15/327 219/401 |
| 2010/0159099 A1 * | 6/2010 | Falgout | ..................... | A23L 5/13 426/510 |
| 2011/0155116 A1 * | 6/2011 | Koos | ......................... | A21B 1/26 126/20 |
| 2011/0256277 A1 | 10/2011 | Bows | | |
| 2011/0278279 A1 * | 11/2011 | Giazzon | ................ | F24C 15/327 219/400 |
| 2012/0017770 A1 * | 1/2012 | Sakane | .................. | F24C 15/327 99/331 |
| 2012/0103318 A1 * | 5/2012 | Kaiser | .................... | F24C 15/327 126/20 |
| 2012/0247342 A1 * | 10/2012 | Van Der Vlis | .......... | A47J 27/05 99/330 |
| 2012/0294992 A1 * | 11/2012 | Sager | ........................ | F24C 7/08 426/231 |
| 2013/0180413 A1 * | 7/2013 | Tjerkgaast | .......... | A47J 37/0641 99/447 |
| 2014/0083992 A1 * | 3/2014 | Linnewiel | ........... | A47J 37/0641 219/400 |
| 2014/0199455 A1 * | 7/2014 | Bilet | ........................ | A47J 27/16 426/510 |
| 2014/0261384 A1 * | 9/2014 | Cooper | .................. | F24C 15/327 126/369 |
| 2014/0312025 A1 * | 10/2014 | Raghavan | .............. | F24C 15/006 219/400 |
| 2014/0319119 A1 * | 10/2014 | Raghavan | ............ | H05B 1/0263 219/396 |
| 2014/0366746 A1 * | 12/2014 | Tsai | ........................ | A47J 37/00 99/403 |
| 2015/0104551 A1 * | 4/2015 | Casper | ..................... | A23P 20/12 426/243 |
| 2015/0173551 A1 * | 6/2015 | Carbone | ................. | A47J 27/04 700/282 |
| 2015/0320094 A1 * | 11/2015 | Onishi | ....................... | A23L 5/17 426/637 |
| 2015/0354827 A1 * | 12/2015 | Faraldi | ..................... | A21B 3/04 426/510 |
| 2016/0033141 A1 * | 2/2016 | Rizzuto | ................. | F24C 15/327 219/396 |
| 2018/0035698 A1 * | 2/2018 | McNerney | ................ | A23L 5/17 |
| 2018/0289212 A1 * | 10/2018 | Sladecek | ............ | A47J 37/0641 |
| 2019/0110504 A1 * | 4/2019 | Sun | ........................... | A23L 5/10 |
| 2019/0387922 A1 * | 12/2019 | Jin | ........................ | A47J 36/321 |

FOREIGN PATENT DOCUMENTS

| | | |
|---|---|---|
| JP | 2008151379 | 7/2008 |
| JP | 2014030462 A | 2/2014 |
| TW | 201223487 A | 6/2012 |
| WO | 2004047542 A1 | 6/2004 |
| WO | 2012032449 A1 | 3/2012 |
| WO | 2013093886 A1 | 6/2013 |

* cited by examiner

APPARATUS AND METHOD FOR PREPARING FOOD

This application is the U.S. National Phase application under 35 U.S.C. § 371 of International Application No. PCT/EP2015/072659, filed on Oct. 1, 2015, which claims the benefit of International Application No. PCT/CN2014/089290 filed on Oct. 23, 2014 and International Application No. 14194127.8 filed Nov. 20, 2014. These applications are hereby incorporated by reference herein.

FIELD OF THE INVENTION

The present invention generally relates to an apparatus and a method for preparing food. In particular, the present invention relates to an apparatus and a method for preparing food by at least moving a flow of hot air over items of food to heat them in an enclosed food preparation chamber.

BACKGROUND OF THE INVENTION

An apparatus for preparing food is known from a patent U.S. Pat. No. 8,299,404 B2. The apparatus is generally used in a domestic setting and provides a means of preparing food for eating by circulating a flow of hot air around the food items to heat and/or cook the food. Such an apparatus generally comprises an enclosed food preparation chamber, into which food items are placed and a flow of hot air is then circulated around the food, until the food is cooked.

In known apparatuses (sometimes called "airfryer" or "air-based fryer"), the heating approach only depends on circulating a flow of hot air and/or radiating heat directly to the target foods, which may not achieve satisfied quality of the food to be cooked.

An air-based fryer uses a high speed air flow to enable frying of foods with a greatly reduced amount of oil. The air flow is all around the food items to provide all around frying. For this purpose, the food may be automatically stirred during the cooking process.

U.S. Pat. No. 5,080,087 discloses a gas stove which is able to bake, boil or steam. It has a substantially sealed oven enclosure including a steam injection means.

SUMMARY OF THE INVENTION

For example, for some foods without coated starch, such as chicken wings, the dry hot air heating approach may be enough to cook them well. However, for some other foods with coated starch, such as starch coated pork piece, only using the dry hot air heating approach may not achieve satisfied sensory quality (taste, aroma, texture, and/or appearance) for those kinds of foods.

Therefore, it is an object of the invention to develop an air-based fryer apparatus and a method for preparing food in an air-based fryer which substantially alleviates or overcomes the problems mentioned above.

According to one aspect of present invention, there is provided an air-based fryer for preparing food, comprising:
 a food preparation chamber comprising an outer wall, an inner wall defining a food receiving space with an air inlet and an air discharge opening, and a circulation channel defined between the outer wall and the inner wall;
 an air heater for heating air in the food preparation chamber;
 a fan for moving a flow of hot air successively through the air inlet, the food receiving space, the discharge opening, and the channel;
 a steam generator comprising at least one nozzle extended into the food receiving space, for spraying temperature-controlled steam onto the food; and
 a controller for controlling the steam generator to spray steam to food placed in the food receiving space for a first predetermined period, and controlling the air heater and the fan to circulate hot air to the food for a subsequent second predetermined period.

For some kinds of food, after spraying the steam onto the food before performing hot air heating, the surface structure of the food will be solidified due to starch gelatinization by low-temperature steam. The major effects induced are a reduction in surface moisture content, surface smoothing by gelatinized starch, and sealing of intercellular pores by cell expansion. Furthermore, since the surface structure of the food is solidified, unwanted water evaporate from inside of the food will be avoided, which can keep the tenderness or crunchiness of the food during subsequent hot air cooking.

In a preferred embodiment, the temperature of the steam is controlled within 60° C.-100° C., and the temperature of the hot air is controlled within 160° C.-250° C.

In a preferred embodiment, the chamber defines a circulation channel for circulating the hot air.

In a preferred embodiment, the steam generator comprises a plurality of nozzles evenly located in the food preparation chamber.

In a preferred embodiment, the outer wall of the food preparation chamber further defines a vent for exhausting air from the outer wall to outside the fryer.

In one embodiment, the food preparation chamber further comprises a division board dividing the food receiving space into two food cooking areas; the steam generator is capable of being controlled to spray the steam onto the food located in any one or both of the two food cooking areas.

In one embodiment, the steam generator comprises:
 a water tank containing water;
 a heater for heating the water to generate the steam; and
 a temperature sensor to sense temperature of the generated steam;
 wherein the controller controls the steam generator to spray the generated steam through the nozzles when the sensed temperature falls in a predetermined range.

In a preferred embodiment, the food is coated with starch before placing in the food receiving space.

According to yet another aspect of present invention, there is provided a method for preparing food, comprising:
a) placing food into the chamber of an air-based fryer;
b) generating temperature-controlled steam and spraying the steam onto the food for a first predetermined period; and
c) heating air and circulating the hot air to heat the food for a subsequent second predetermined period.

In a preferred embodiment, the temperature of the steam is controlled within 60° C.-100° C., and the temperature of the hot air is controlled within 160° C.-250° C.

In one embodiment, the method further comprises a step between the steps a) and b). The step comprises: heating air and circulating the hot air to heat the food for a third predetermined period, wherein the third predetermined period is less than 30 seconds. This added step may reduce surface moisture content so as to increase its water hydration properties, for some kinds of food such as food coated with thin starch.

In one embodiment, the method further comprises a step between the steps b) and c). The step comprises: spraying the temperature-controlled steam to the food and at the same time circulate the hot air to the food for a third predetermined period, wherein the temperature of the hot air controlled during this step is less than the temperature of the hot air controlled during the step c), the third predetermined period is less than 10 seconds. This added step may remove the surface water after the starch gelatinization so as to form puff or web-like texture in the next step, for some kinds of food, such as vegetables coated with starch, e.g. eggplant, potato slices, etc.

In a preferred embodiment, before step a), further comprises: coating starch onto the surface of the food.

BRIEF DESCRIPTION OF THE DRAWINGS

Preferred embodiments of the invention will now be described, by way of example only, with reference to the accompanying drawings, in which:

FIG. 9b shows a pork piece cooked by the apparatus of FIG. 5 after performing the first control curve of FIG. 9a;

FIG. 10b shows a pork piece cooked by the apparatus of FIG. 5 after performing the second control curve of FIG. 10a.

DETAILED DESCRIPTION OF EMBODIMENTS

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield still a further embodiment. It is intended that the disclosure encompass these and other modifications and variations as come with the scope and spirit of the disclosure.

Figure 1:
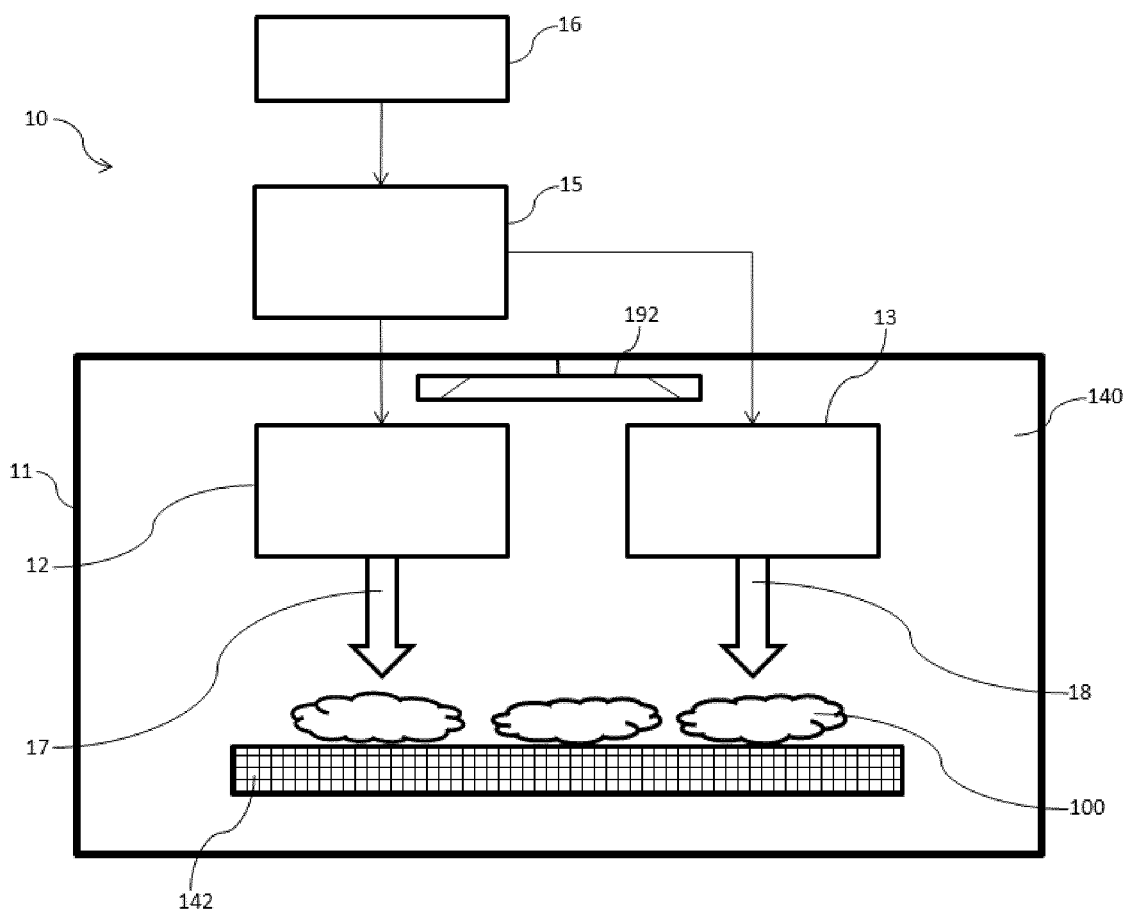
FIG. 1 shows a schematic view of an apparatus for preparing food.

Embodiments of the present invention are described on the basis of an exemplary apparatus 10 for preparing food as shown in FIG. 1. In the latter paragraphs, detailed embodiments of the apparatus 10 will be described along with FIGS. 5-8.

In the illustrated embodiment of FIG. 1, the apparatus 10 mainly includes an outer wall 11 defining an enclosed food preparation chamber 140, a steam generator 12, an air heater 13 and a controller 15.

In some embodiments, the food preparation chamber 140 may include a food supporting board 142 located therein. Some raw food 100 can be placed on the supporting board 142 during cooking process. For enhancing hot air contact efficiency, the food supporting board 142 may be designed as air permeable construction, such as a mesh or grid arrangement in some embodiments.

The steam generator 12 includes a steam generating mechanism, which can generate temperature-controlled steam 17. In preferred embodiments, the temperature-controlled steam 17 is low-temperature steam which temperature range falls within about 60° C.-100° C. The steam generator 12 may further include a steam spraying mechanism used to spray the steam 17 on proper position of the food 100. The latter embodiment of FIG. 5 will describe a detailed steam spraying mechanism.

The air heater 13 may be any appropriate heating source, such as electric heater, which can heat air to become hot air, for example heating air to about 160° C.-250° C. through setting proper power of the heater 13. In preferred embodiments, the apparatus 10 further includes a fan 192 arranged in an appropriate position in the chamber 140, for example attached to the top inner surface thereof, to circulate the hot air 18 to the food 100 continuously. The rotate speed of the fan 192 can be adjusted according to different cooking requirements.

The controller 15 is used to provide the whole control for the apparatus 10, such as to control the steam generator 12, the air heater 13, and the fan 192 based on predetermined programs. For ease of controlling, the apparatus 10 may further include a control panel 16, to provide a user interface for user to operate easily. For example, the control panel 16 may include temperature knobs (not shown) to respectively adjust the temperature of the steam 17 and the temperature of the heated air 18, timing knobs (not shown) to respectively adjust the operating time of spraying steam 17 and circulating hot air 18. The latter paragraphs will describe three embodiments of cooking methods performed by the apparatus 10, as examples.

In different embodiments, the steam generator 12 may be arranged inside of the chamber 140, or arranged outside of the chamber 140, or one part is arranged inside of the chamber 140 and the other part is arranged outside of the chamber 140. Also, the air heater 18 may be arranged in appropriate position in the apparatus 10, for example arranged on an upper level inside of the chamber 140 and underneath the fan 192.

Figure 2:
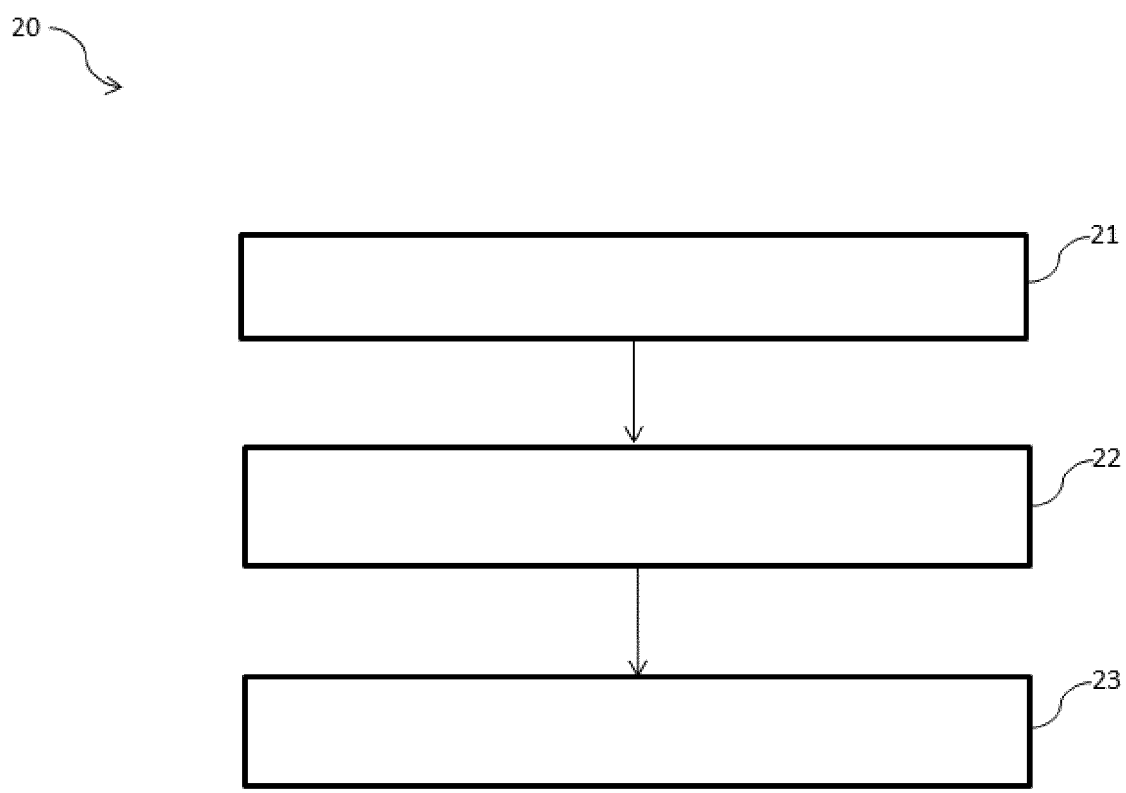
FIG. 2 shows a cooking method performed by the apparatus of FIG. 1, according to one embodiment.

Referring to FIG. 2, a cooking method 20 for preparing food 100 performed by the apparatus 10 according to an embodiment is shown. The cooking method 20 includes the steps of:

Step 21: place the food 100 onto the supporting board 142 of the chamber 140. In preferred embodiments, the food 100 is coated by starch before placing on the supporting board 142. In some embodiments, the starch coated food 100 may be further splashed small amount of oil on their surface before cooking.

Step 22: spray the temperature-controlled steam 17 to the food 100 for a predetermined period, for example about 2-15 minutes, according to predetermined programs stored in the controller 15. As mentioned above, the temperature of the steam 17 is controlled within 60° C.-100° C. as low-temperature steam, for example controlled to about 80° C. at one preferred cooking mode. The predetermined period of spraying the steam 17 depends on food amount and/or food types. For example, a maximum range may be defined as 60° C. for 15 minutes, 80° C. for 7 mins, 100° C. for 2 minutes.

Step 23: circulate the hot air 18 to heat the steamed food 100 for a predetermined period, such as 10-25 minutes, according to predetermined programs stored in the controller 15. As mentioned above, the temperature of the hot air 18 is controlled within 160° C.-250° C., for example controlled to about 180° C. at one preferred cooking mode.

After spraying the steam 17 onto the food 100 in step 22, especially for starch coated food, the surface structure of the food 100 will be solidified due to starch gelatinization by low-temperature steam before hot air cooking. The major effects induced are a reduction in surface moisture content, surface smoothing by gelatinized starch, and sealing of intercellular pores by cell expansion. Furthermore, after spraying the steam 17 onto the food 100, since the surface structure of the food 100 will be solidified, unwanted water evaporate from inside of the food 100 will be avoided, which can keep the tenderness or crunchiness of the food 100 during subsequent hot air cooking process. Thus, the solidified food 100 will be cooked better in the subsequent hot air heating process than only using hot air heating process (step 23) without the pre-steaming process (step 22).

After hot air circulating around the steamed food 100, a satisfied food 100 is cooked. The latter paragraphs will give detailed examples to show one kind of food 100 to be cooked by only hot air mode and by combination of steam and hot air mode, along with FIG. 9a, FIG. 9b, FIG. 10a, and FIG. 10b.

According to different kinds of food, the above method 20 may need further appropriate adjustments. For example, another two optional methods will be described as follow, but not limited to the scope of this invention.

Figure 3:
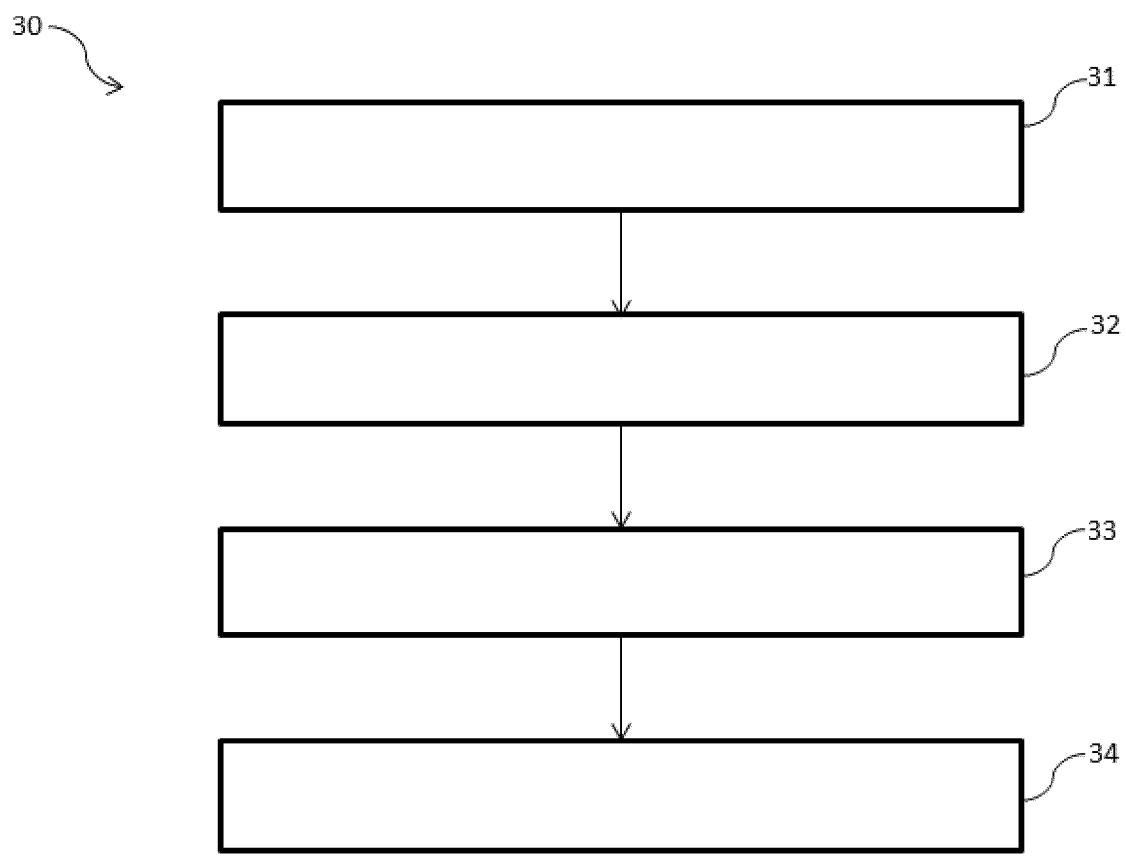
FIG. 3 shows a cooking method performed by the apparatus of FIG. 1, according to another embodiment.

Referring to FIG. 3, a cooking method 30 for preparing food 100 performed by the apparatus 10 according to another embodiment is shown. The method 30 includes the steps of:

Step 31: place the food 100 onto the supporting board 142 of the chamber 140. Step 32: circulate the hot air 18 to heat the food 100 for a first predetermined period which is less than 30 seconds, such as about 15 seconds. As mentioned above, the temperature of the hot air 18 is controlled within 160° C.-250° C., for example controlled to about 180° C. In this very short cooking period, the surface water of the food 100 will be evaporated very soon, which can reduce surface moisture content so as to increase its water hydration properties.

Step 33: spray the temperature-controlled steam 17 to the food 100 for a second predetermined period, for example about 1 minute. As mentioned above, the temperature of the steam 17 is controlled within 60° C.-100° C., for example controlled to about 80° C.

Step 34: circulate the hot air 18 to heat the steamed food 100 for a third predetermined period, such as 10-25 minutes. As mentioned above, the temperature of the hot air 18 is controlled within 160° C.-250° C., for example controlled to about 180° C. In preferred embodiments, the first predetermined period is very short which is much less than the third predetermined period.

Compared with the method 20, the method 30 further added a pre-heating process (step 32) through circulating the hot air 18 onto the food 100 first in a very short time. This added step 32 can reduce surface moisture content so as to increase its water hydration properties, for some kinds of food such as food coated with thin starch.

Figure 4:
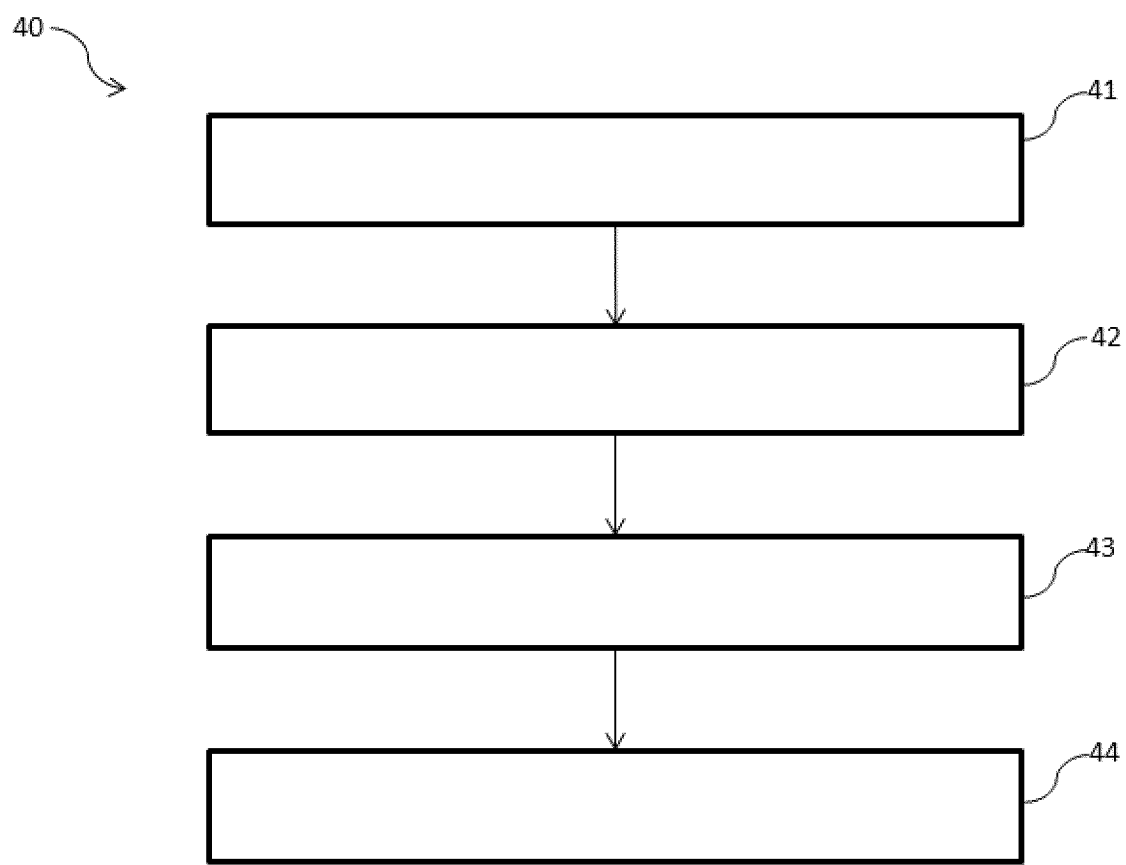
FIG. 4 shows a cooking method performed by the apparatus of FIG. 1, according to yet another embodiment.

Referring to FIG. 4, a cooking method 40 for preparing food 100 performed by the apparatus 10 according to yet another embodiment is shown. The method 40 includes the steps of:

Step 41: place the food 100 onto the board 14 of the chamber 140.

Step 42: spray the temperature-controlled steam 17 onto the food 100 for a first predetermined period, for example about 1 minute. As mentioned above, the temperature of the steam 17 is controlled within 60° C.-100° C., for example controlled to about 80° C.

Step 43: spray the temperature-controlled steam 17 to the food 100 and at the same time circulate the hot air 18 to heat the steamed food 100 for a second predetermined period which is less than 10 seconds, such as about 5 seconds. As mentioned above, the temperature of the hot air 18 is controlled within 100° C.-120° C., for example controlled to about 105° C.

Step 44: circulate the hot air 18 to heat the steamed food 100 for a third predetermined period, such as 10-25 minutes. As mentioned above, the temperature of the hot air 18 is controlled within 160° C.-250° C., for example controlled to about 180° C. In preferred embodiments, the temperature of the hot air 18 controlled during the step 43 is lower than the temperature of the hot air 18 controlled during the step 44.

Compared with method 20, the method 40 further added a medium-heating process (step 43) through spraying the steam 17 and circulating the hot air 18 to the food 100 at the same time in a very short time. This added step 43 can remove the surface water after the starch gelatinization so as to form puff or web-like texture in the next step, for some kinds of food, such as vegetables coated with starch, e.g. eggplant, potato slices, etc.

It is understood that, above three methods 20, 30, 40 are only exemplary examples to explain how to perform the apparatus 10 to cook different kinds of food. The above parameters can be adjusted according to different cooking requirements. For example, the controller 15 can store many cooking programs in advance for cooking different kinds of food.

Figure 5:
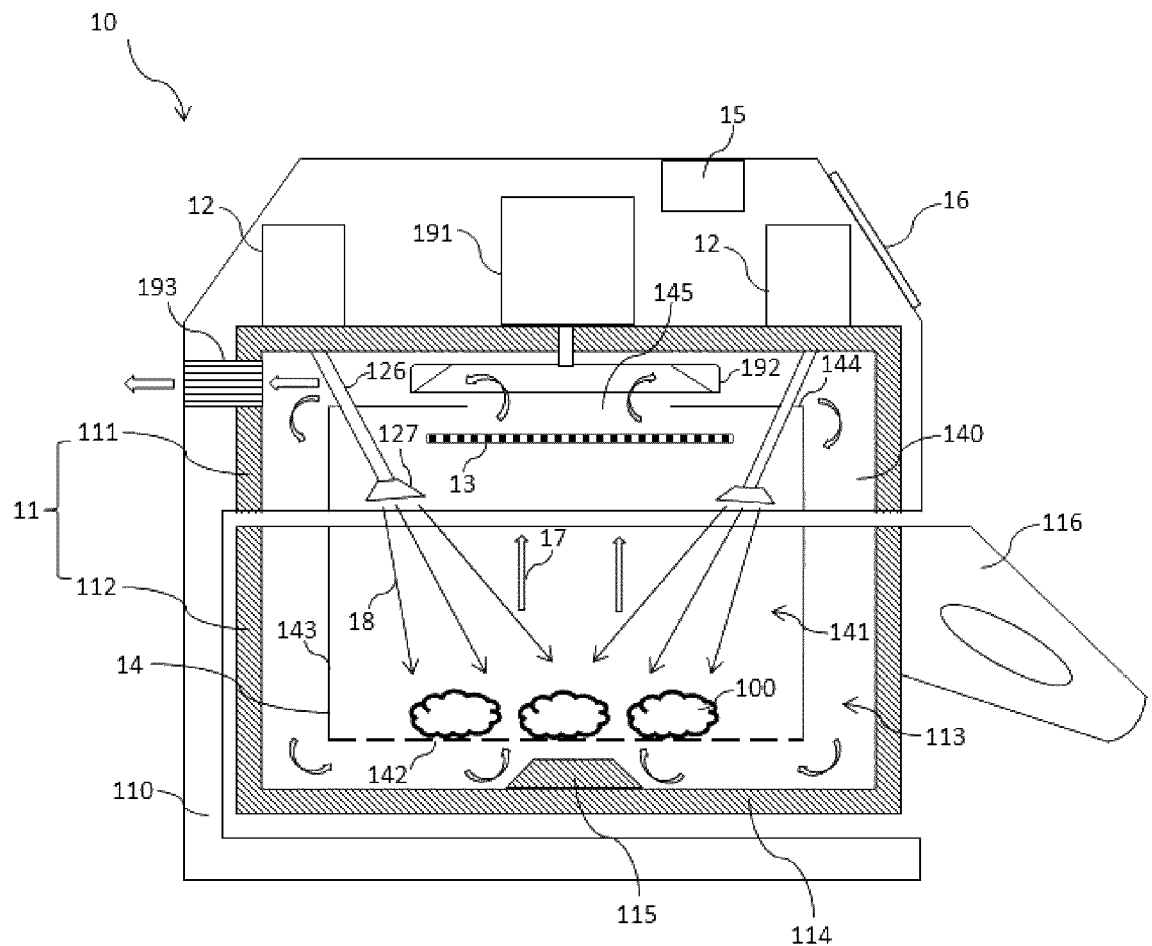
FIG. 5 shows a schematic cross-sectional view of an exemplary embodiment of the apparatus of FIG. 1.

As an exemplary embodiment of the apparatus 10, FIG. 5 shows a detailed embodiment of the apparatus 10. The apparatus 10 illustrated in FIG. 5 includes an outer shell 110. The apparatus 10 is configured to prepare food items placed therein by heating, so as to heat and/or cook the food items ready for consumption.

Referring to FIG. 5, the outer shell 110 extends around an outer wall 11 which defines a food preparation chamber 140. An inner wall 14 is disposed in the food preparation chamber 140 and defines a food receiving space 141 in which food items 100 will be heated and/or cooked. The outer wall 11 and the inner wall 14 extend substantially parallel to and are spaced from each other to define a circulation channel 113 therebetween, which acts as an air guide means along which hot air 17 flows, as will be explained hereinafter.

The inner wall 14 comprises a bottom part 142 and a side wall 143 which extends around and upstands from the bottom part 142. The bottom part 142 of the inner wall 14 is provided with an air-permeable section which acts as an air inlet to the food receiving space 141 and a top part 144 of the inner wall 14 is provided with a discharge opening 145 to allow air 17 to flow therethrough. In some embodiments, the air permeable section of the bottom part 142 is formed by known means, such as a mesh or grid arrangement.

A fan 192 is disposed in the food preparation chamber 140, above the discharge opening 145 of the inner wall 14. The fan 192 is driven by a motor 191 acting as a drive means to rotate the fan 192. The fan 192 is operable to move a flow of hot air 17 by sucking air from through the discharge opening 145 by means of a low pressure generated on one side of the fan 192 and expelling a high pressure flow of air into the circulation channel 113 defined between the outer wall 11 and the inner wall 14. Therefore, air expelled from the fan 192 flows along the channel 113 acting as an air guide means defined between the outer wall 11 and the inner wall 14 to the air permeable section of the bottom part 142. The air then flows through the air permeable section of the bottom part 142, to the food receiving space 141.

A heater 13 acting as a heat radiating means is disposed in an upper part of the food preparation chamber 140. In this embodiment, the heater 13 is disposed in an upper portion of the food receiving space 141 below the discharge opening 145, although it will be appreciated that the heater 13 may be disposed outside the inner wall 14. The heater 13 is disposed to heat air 17 flowing through the upper portion of the food receiving space 141. Furthermore, the heater 13 is positioned in the food receiving space 141 to radiate heat into the heat receiving space 141 and towards any food items 100 disposed therein.

Air flowing in the channel 113 between the bottom part 142 of the inner wall 14 and a base 114 of the outer wall 11, is directed to flow upwardly through the air-permeable section of the bottom part 142 by means of an air deflector 115 which sits on the base 114 of the outer wall 11 and directs the flow of air upwardly.

In some embodiments, a vent 193 is formed in the outer wall 11 of the apparatus 10 and defines an air outlet from the food preparation chamber 140 to outside the apparatus 10. The vent 193 is disposed at a top end of the food preparation chamber 140 and is formed at an upper end of the channel 113 proximate to the fan 192. The vent 193 and fan 192 are positioned at the top end of the food preparation chamber 140 to reduce contact of liquid discharged from the food items 100 collecting on the fan 192 and being discharged through the vent 193. In other embodiments, the vent 193 can be defined at any other appropriate position in the outer wall 11.

In some embodiments, the fan 192 is a radial fan and the vent 193 is formed in the outer wall 11 on a line extending in a radial direction to the axis of rotation of the fan 192.

Figure 6:
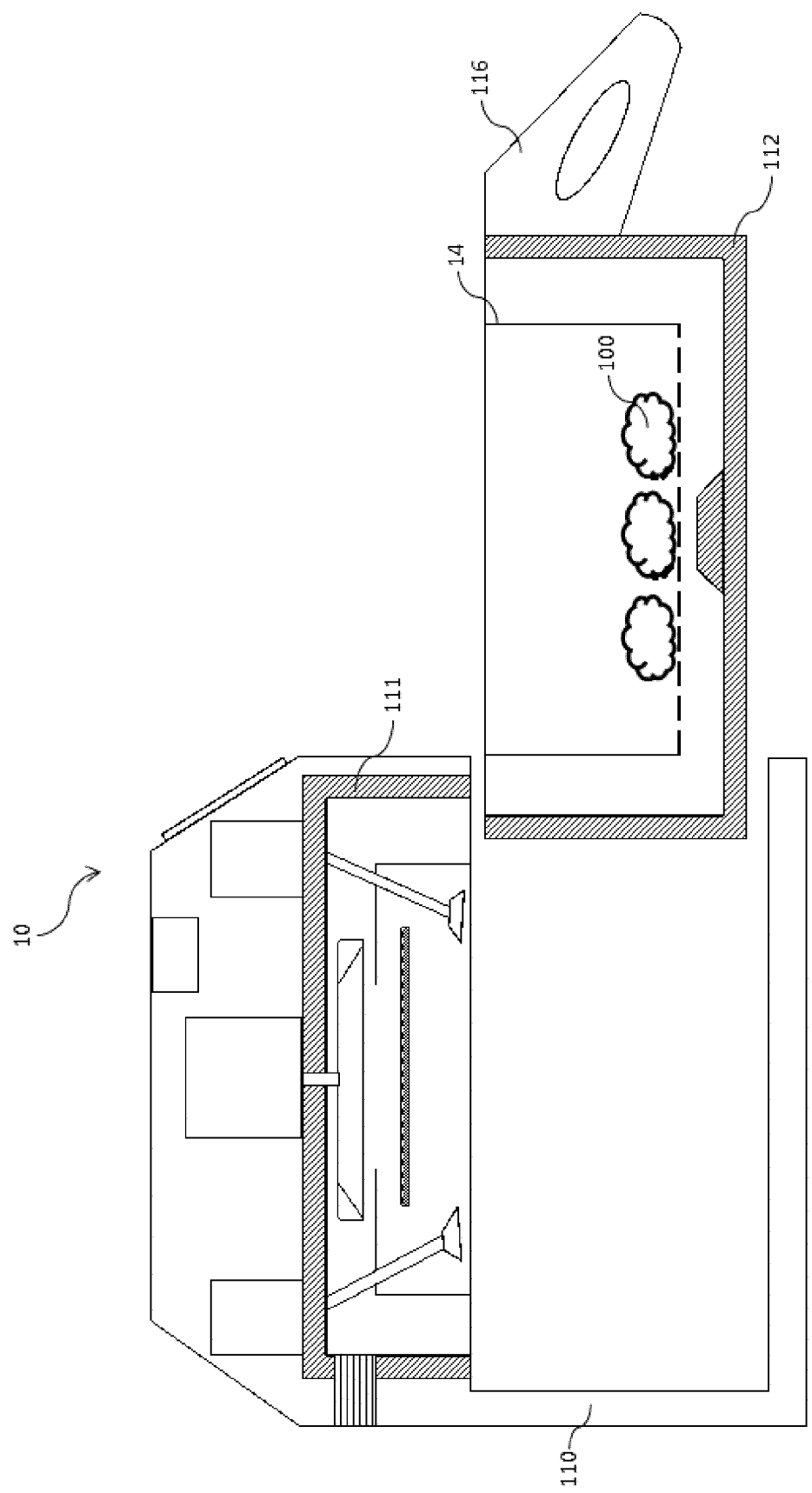
FIG. 6 shows another status of the apparatus of FIG. 5.

The food preparation chamber 140 is arranged in two parts, in detail, the outer wall 11 is arranged in two parts, an upper part 111 and a lower part 112. The upper part 111 is fixedly mounted to the outer shell 110 of the apparatus 10, and the lower part 112 is releasable from the upper part 111 so that it is removable from the upper part 111 to enable access to the food preparation chamber 140. Referring continue to FIG. 6, the lower part 112 comprises a handle 116 to aid the removal of the lower part 112 from the shell 110 and to separate it from the upper part 111. Therefore, the lower part 112 forms a basket or basin shaped arrangement, with an upper opening, so that food items 100 can be placed in or removed from the food receiving space 141. Correspondingly, the inner wall 14 is arranged in two parts as well to match the upper part 111 and the lower part 112 of the outer wall 11, which will be not described in detail.

The lower part 112 of the outer wall 11 is insertable in the outer shell 110 so that the lower part 112 lies flush with the upper part 111 to form the food preparation chamber 140.

Referring back to FIG. 5, a control panel 16 is mounted to the outer shell 110 to enable the operation of the controller 15 of the apparatus 10, for example the time of operation and the temperature of operation in the food preparation chamber 140.

Except above configuration of the apparatus 10, a steam generator 12 is further provided in the apparatus 10. For example, the main body of the steam generator 12 is located on the top of the outer wall 11, and steam pipes 126 with nozzles 127 are extended into the food preparation chamber 140 and the spraying direction (see arrows) towards to the food 100 placed on the bottom part 142.

In the illustrated embodiment of FIG. 5, the steam generator 12 includes two steam pipes 126 symmetrically extended into the food preparation chamber 140, which may spray steam 18 onto the food 100 evenly. In other embodiments, the arrangement of the steam pipes 126 with nozzles 127 may be changed according to different spraying needs. The steam generator 12 is controlled by the controller 15.

Figure 7:
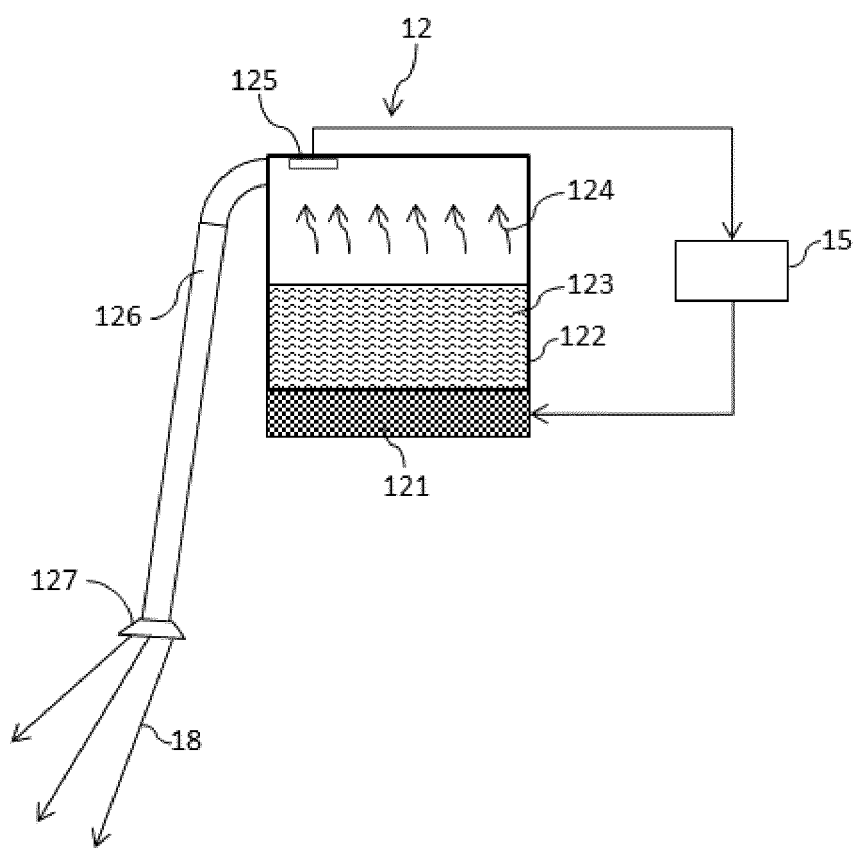
FIG. 7 shows a schematic view of an exemplary embodiment of a steam generator of the apparatus of FIG. 5.

Referring to FIG. 7, an exemplary embodiment of the steam generator 12 is shown. In this unlimited embodiment, the steam generator 12 includes a heater 121, a water tank 122 thermally attached to the heater 121. The water tank 122 is used to contain water 123. The water tank 122 is communicated with the pipe 126. A temperature sensor 125 is arranged in the water tank 122 to sense temperature of generated steam 124 therein. The controller 15 is used to control the heater 121 to heat the water 123 according to the sensed value of the sensor 125, and control the spraying operation of the steam generator 12 through the pipe 126 with the nozzle 127. For example, the heater 121 heats the water 122, and the sensor 125 senses the temperature of the generated steam 124, when the generated steam 124 falls within the predetermined temperature range, the controller 15 controls the steam generator 12 to spray the steam 18 onto the food 100 through appropriate switch/trigger mechanisms (not shown).

Figure 8:
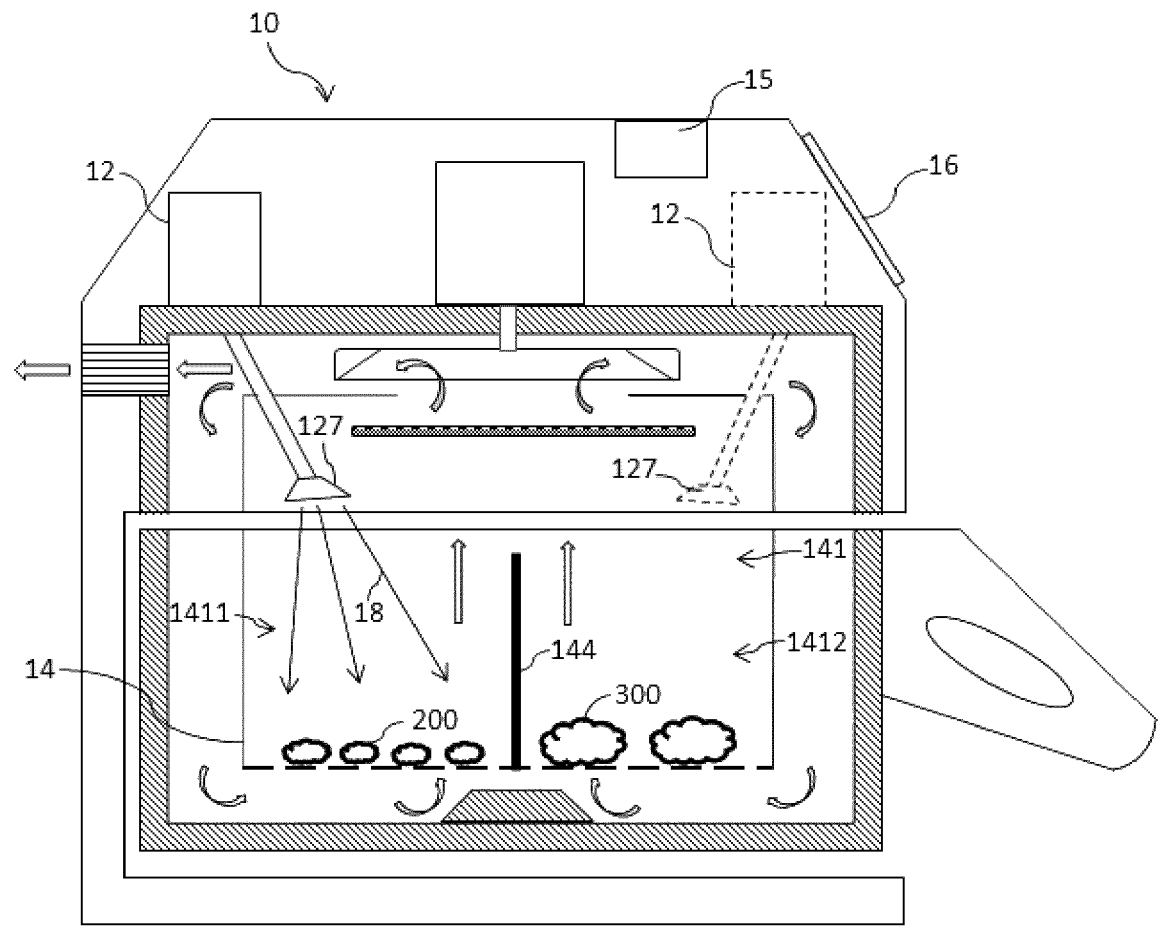
FIG. 8 shows a schematic cross-sectional view of another exemplary embodiment of the apparatus of FIG. 1.

Referring to FIG. 8, another detailed embodiment of the apparatus 10 is shown. Compared with the embodiment of FIG. 5, this embodiment of FIG. 8 further includes a division board 144. The division board 144 can be optionally placed in the food preparation chamber 140 to divide it into two food preparation areas which can prepare two different kinds of food, such as shown food 200 and food 300, at the same time.

As an example, if the food 200 is better to be prepared by combination of low-temperature pre-steaming process and hot air heating, the nozzle 127 located on the side of the food 200 will be controlled at an enable status. If the food 300 is better to be prepared by only hot air heating, the nozzle 127 located on the side of the food 300 will be controlled at a disable status (shown as dotted lines). Therefore, two kinds of food 200 and 300 can be prepared at the same time by using the apparatus 10, which can achieve satisfied cooked foods 200 and 300 at the same time.

Operation of the apparatus 10 for preparing food will now be described with reference to FIGS. 5-8.

A user initially removes the lower part 112 of the out wall 11 from the outer shell 110 by holding the handle 116 and extracting the lower part 112 from the outer shell 110. This separates the lower part 112 from the upper part 111 of the out wall 11 and allows the user to access the food preparation chamber 140. The user then places the desired food items 100 into the food preparation chamber 140, namely places them on the air permeable section of the bottom part 142. This positioning of the food items on the air permeable section of the bottom part 142 allows hot air 17 to be blown past the food 100 to improve heating of the food 100 due to the hot air flow 17, and allows liquid from the food, for example water and oil to fall through the air permeable section of the bottom part 142 from the food preparation chamber 140.

The lower part 112 is then inserted in the outer shell 110 so that the upper and lower parts 111, 112 of the out wall 11 lie flush with each other. The user is then able to operate the apparatus 10 by means of the control panel 16. When the apparatus 10 is operated, the steam generator 12, the heater 13, and the fan 192 is operated to spray steam 18, and circulate hot air 17 to the food 100 according to predetermined programs.

In some cooking processes, the division board 144 is placed into the food preparation chamber 140 to cook two kinds of food 200 and 300 at the same time. The steam generator 12 can be optionally triggered according to different cooking needs.

Other features and uses of the invention and their associated advantages will be evident to a person skilled in the art upon reading the description and the examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

The Preparation of Pork Piece Only Using Hot Air Heating Process.

Figure 9A:
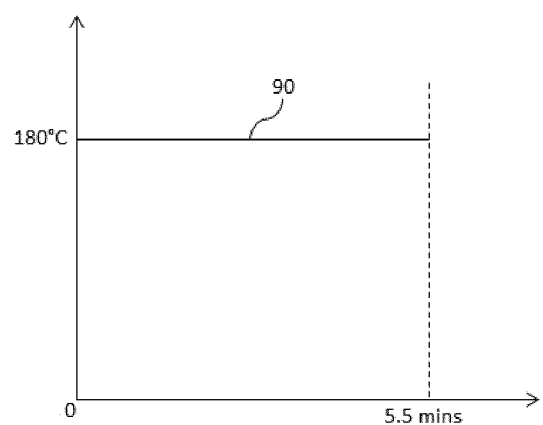
FIG. 9a shows a first control curve performed by the apparatus of FIG. 5.
Figure 9B:
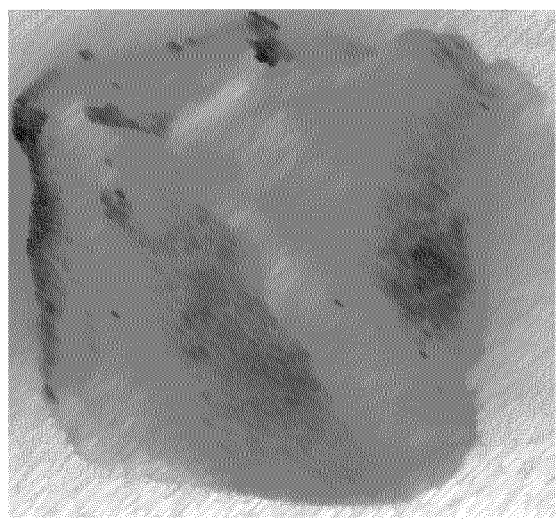

A pork piece is coated with starch before placing into the food preparation chamber 140. The cooking program is set to only preform circulating hot air onto the food for about 5.5 minutes and the temperature of the hot air is controlled at about 180° C. FIG. 9a shows the control curve 90 according to above cooking programs. FIG. 9b illustrates the cooked pork piece. The hardness of the cooked pork piece is about 43.955 g measured by a known professional equipment "texture analyzer" in food industry.

Example 2

The Preparation of Pork Piece Using Both Steam and Hot Air Heating Process.

Figure 10A:
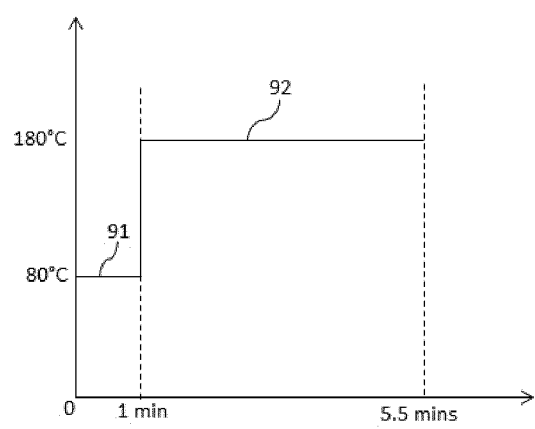
FIG. 10a shows a second control curve performed by the apparatus of FIG. 5.
Figure 10B:
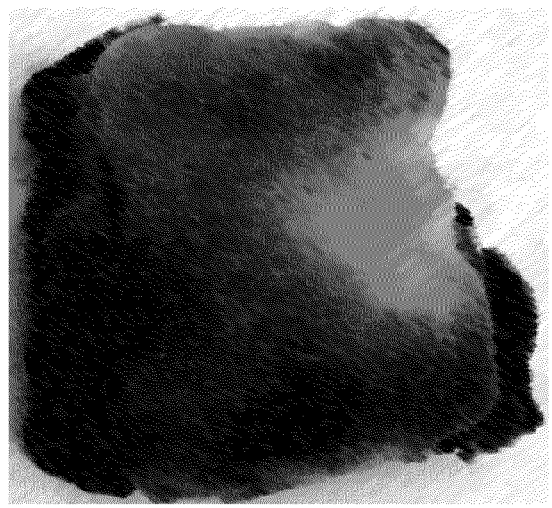

A pork piece is coated with starch before placing into the food preparation chamber 140. The cooking program is set to preform spaying steam and then circulating hot air onto the food for about 5.5 minutes totally. The time period of spaying steam is about 1 minute and the time period of circulating hot air is about 4.5 minutes. The temperature of the steam is controlled at about 80° C. and the temperature of the hot air is controlled at about 180° C. FIG. 10a shows the control curves 91 and 92 according to above cooking program. FIG. 10b illustrates the cooked pork piece. The hardness of the cooked pork piece is about 22.996 g measured by the texture analyzer mentioned above at the same condition.

Compared with the Example 1 and Example 2, since the hardness of the cooked pork piece of Example 2 is less than the hardness of that of Example 1, which means texture of the cooked pork piece of Example 2 is tenderer than that of Example 1. Furthermore, comparing the appearance of the cooked pork piece of them in FIGS. 9b and 10b, the one in Example 2 looks more browning and appealing than the one in Example 1. Therefore, for some kinds of food, providing additional pre-steaming process before hot air heating will definitely enhance food quality.

One skilled in the art would readily appreciate that the methods, devices and equipments described herein are representative of exemplary embodiments, and not intended as limitations on the scope of the invention. It will be readily apparent to one skilled in the art that varying substitutions and modifications may be made to the present disclosure disclosed herein without departing from the scope and spirit of the invention.

All publications mentioned in the specification are indicative of the levels of those skilled in the art to which the present disclosure pertains. All publications are herein incorporated by reference to the same extent as if each individual publication was specifically and individually indicated as incorporated by reference.

The invention claimed is:

1. An air-based fryer, comprising:
a food preparation chamber comprising an outer wall, an inner wall defining a food receiving space with an air inlet and an air discharge opening, and a circulation channel defined between the outer wall and the inner wall;
an air heater for heating air in the food preparation chamber;
a fan for moving a flow of the heated air successively through the air inlet, the food receiving space, the discharge opening, and the channel;
a steam generator comprising at least one nozzle extended downward in the food receiving space and configured to spray temperature-controlled steam onto the food; and
a controller configured by a predetermined program to control the steam generator to spray steam to the food placed in the food receiving space for a first predetermined period without performing hot air heating by the air heater during the first predetermined period, wherein the controller is configured by the predetermined program to control the first predetermined period and a temperature of the steam together to produce all major cooking results during the first predetermined period to occur at a surface of the food including to control the temperature of the steam to within 60° C.-100° C., and
wherein the controller is configured by the predetermined program to control the air heater and the fan to circulate the heated air to the food subsequent to the first predetermined period during a subsequent second predetermined period.

2. The air-based fryer according to claim 1, wherein the controller is configured by the predetermined program to control the temperature of the steam to within 60° C.-80° C., and to control the temperature of the heated air to within 160° C.-250° C.

3. The air-based fryer according to claim 1, wherein the steam generator comprises one or more downward and inward extending nozzles located in the food preparation chamber, and wherein the one or more nozzles extend downward with reference to an orientation of the air-based fryer during use and diagonally inward with reference to the food preparation chamber.

4. The air-based fryer according to claim 1, wherein the outer wall of the food preparation chamber further defines a vent that extends through the outer wall to exhaust air from the outer wall to outside the fryer.

5. The air-based fryer according to claim 1, wherein the food preparation chamber further comprises a division board that extends upward from a bottom portion of the inner wall during operation dividing the food receiving space into two horizontally adjacent food cooking areas, the steam generator is configured to be controllable to spray the steam onto the food located in any one or both of the two food cooking areas.

6. The air-based fryer according to claim 1, wherein the steam generator comprises:
   a water tank containing water;
   a heater for heating the water to generate the steam; and
   a temperature sensor positioned within the water tank and configured to sense temperature of the generated steam;
   wherein the controller is configured by the predetermined program to control the steam generator to spray the generated steam through the nozzles only when the sensed temperature falls in a predetermined range.

7. The air-based fryer according to claim 1, wherein the controller is configured by the predetermined program to control the air heater and the fan to circulate heated air to the food at a temperature between 160° C.-250° C. for a third predetermined period that is less than 30 seconds to reduce the surface moisture content, and wherein the third predetermined period is prior to the first predetermined period.

8. The air-based fryer according to claim 1, wherein the controller is configured by the predetermined program to control the steam generator to spray steam to the food placed in the food receiving space and to simultaneously control the air heater and the fan to circulate heated air to the food for a third predetermined period that is between the first predetermined period and the second predetermined period.

9. The air-based fryer according to claim 1, wherein the steam generator is contained within the food receiving space.

10. The air-based fryer according to claim 1, comprising an air deflector positioned on a base of the outer wall, the air deflector comprising sloping walls to deflect air circulating in the circulation channel upward into the food receiving space.

11. The air-based fryer according to claim 1, wherein the fan is a radial fan.

12. The air-based fryer according to claim 11, wherein the outer wall of the food preparation chamber further defines a vent that extends through the outer wall to exhaust air from the outer wall to outside the fryer, and wherein the vent is formed in the outer wall on a line extending in a radial direction to an axis of rotation of the fan.

13. The air-based fryer according to claim 1, comprising an outer shell that extends around the outer wall, wherein the controller is configured by the predetermined program to produce all the major cooking results at the surface of the food that includes at least one of a reduction in surface moisture content, surface smoothing, and sealing of intercellular pores at the surface of the food.

14. The air-based fryer according to claim 13, wherein the food preparation chamber is divided into an upper part and a lower part, wherein the upper part is fixedly attached to the outer shell, and wherein the lower part is releasably attached to the upper part and is removable from within the outer shell to provide access to the food receiving space.

15. The air-based fryer according to claim 1, wherein the predetermined program is one of a plurality of predetermined programs which control the steam generator to spray steam to the food placed in the food receiving space for the first predetermined period, and to control the air heater and the fan to circulate the heated air to the food for the subsequent second predetermined period, and wherein each of the plurality of predetermined programs varies one or more of the first predetermined period, the second predetermined period, a temperature of the sprayed steam, and a temperature of the circulated heated air.

* * * * *